United States Patent [19]
Wells

[11] 3,946,494
[45] Mar. 30, 1976

[54] TOROIDAL ELECTROLYTIC ANGLE TRANSDUCER
[75] Inventor: Perry L. Wells, Loveland, Colo.
[73] Assignee: Hewlett-Packard Company, Palo Alto, Calif.
[22] Filed: Sept. 30, 1974
[21] Appl. No.: 510,662

[52] U.S. Cl. .............................................. 33/366
[51] Int. Cl.² ......................................... G01C 9/06
[58] Field of Search ............ 33/366; 338/43, 44, 80, 338/81; 73/516 R, 516 LM, 517 R; 324/65 R

[56] References Cited
UNITED STATES PATENTS

| | | |
|---|---|---|
| 2,978,638 | 4/1961 | Wing et al..................... 73/517 R X |
| 3,171,213 | 3/1965 | Swarts et al. ......................... 33/366 |
| 3,442,023 | 5/1969 | Remington et al. .................. 33/366 |
| 3,823,486 | 7/1974 | Bhat et al. ............................ 33/366 |

Primary Examiner—Richard E. Aegerter
Assistant Examiner—Charles E. Phillips
Attorney, Agent, or Firm—Ronald E. Grubman

[57] ABSTRACT

A toroidal electrolyte-type angular transducer is provided for measuring angular displacement or tilt from a vertical plane. Three conducting paths in the electrolyte are established between two measuring electrodes and an auxilliary electrode respectively and a common electrode. Angular displacement is simply related to the values of the conductances in the various paths. In a preferred embodiment of the invention several guard-ring electrodes are included to divert spurious leakage currents from the common electrode so that the leakage current will not affect the measurement. The guard-ring electrodes are maintained at the same potential appearing at the collector electrode to ensure that no leakage currents pass between the two. Another preferred embodiment the invention provides that the two measuring electrodes are driven by voltages equal in magnitude and opposite in sign. A high gain operational amplifier is interconnected between the auxiliary electrode and the common electrode. By means of this arrangement a single voltage reading may be obtained which is directly proportional to angular displacement.

7 Claims, 10 Drawing Figures

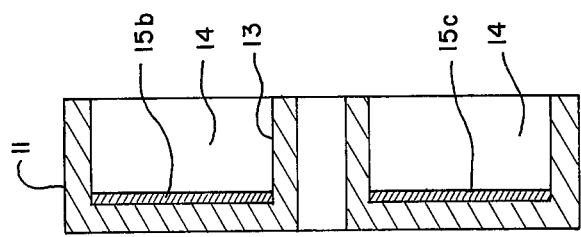
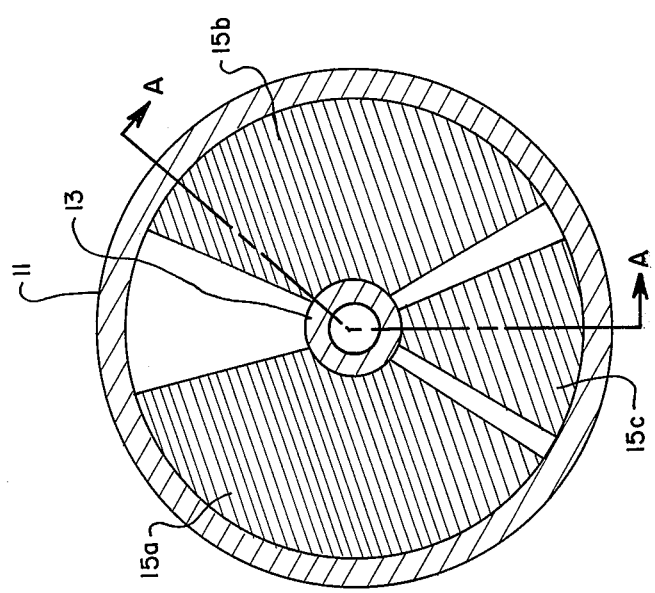
Figure 1B
Figure 1A

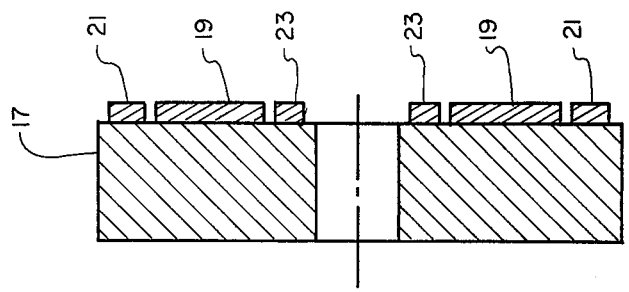
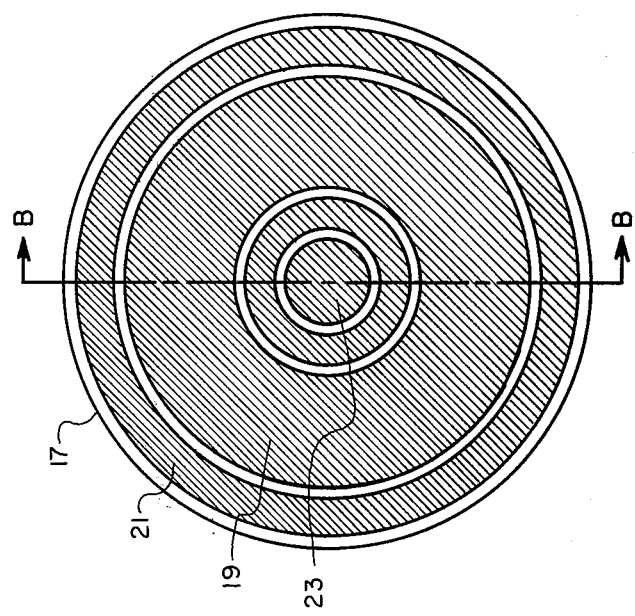

TOROIDAL ELECTROLYTIC ANGLE TRANSDUCER

BACKGROUND OF THE INVENTION

The invention is concerned with a toroidal angle detector for measuring angular displacement from the vertical, sometimes referred to as tilt. Toroidal sensors are known in the art. These commonly include a toroidal cavity enclosing an electrolytic liquid between different electrodes to form various conducting paths in the electrolyte. When the device tilts, only some portions of the electrodes are in contact with the electrolyte, so that the conductance of the different paths is a function of the angular displacement. The resistance or conductance of the various paths is then measured and compared to provide an indication of the tilt of the device.

In prior art devices it has been discovered that undesired leakage currents may degrade the precision of the transducer. Such leakage currents may be caused e.g. by external mechanical agitation which induces sloshing of the electrolyte onto the interior surfaces of the device above the liquid level. These leakage currents can degrade the precision of the measurement by slowing the response time to angular changes and by introducing instabilities which are time and temperature dependent.

It is therefore an object of the present invention to provide a toroidal angle detector which is insensitive to unwanted leakage currents.

In presently known toroidal detectors, the various conductance values required to provide an indication of the tilt of the device are measured separately e.g. by making a number of distinct voltage measurements. The separate voltages are then employed in an independent calculation to derive the angular measurement. In addition to the inherent complexities of this procedure, the necessity of making separate voltage measurements entails continuous electrical switching among various terminals which may introduce additional transducer leakage currents.

It is therefore another object of the present invention to provide a sensor in which the angular displacement may be simply determined from a single voltage measurement without extraneous calculation or switching of transducer terminals.

SUMMARY OF THE INVENTION

In accordance with the illustrated preferred embodiments, the present invention utilizes two measuring electrodes and an auxiliary electrode all interconnected through an electrolyte with a common electrode to provide various conducting paths in the electrolyte. The conductance values at any time are determined by the angular displacement and may be measured to provide an indication of the tilt of the sensor. According to the invention, at least one guard-ring electrode is provided to minimize the effects of unwanted leakage currents in the measurement. The guard-ring electrode is positioned so that stray leakage currents will be diverted away from the common electrode to the guard-ring electrode. In accordance with the invention, this electrode is driven by the same voltage which appears at the common electrode to ensure that no leakage currents will flow between the guard electrode and the common electrode. In accordance with another preferred embodiment of the invention, analog circuitry is provided and interconnected among the various electrodes of the sensor so that the angular displacement may be derived from only single voltage measurement. In particular, the invention provides that the two measuring electrodes are driven by applied voltages which are equal in magnitude but opposite in sign. A high gain operational amplifier is interposed between the auxiliary electrode and the common electrode. The transfer function of the resulting circuit is such that the ratio of the measured output voltage to the driving input voltage is a simple linear function of the angular displacement. Thus only a single voltage measurement and no electrical switching or external calculation is required to provide an indication of angular displacement.

DESCRIPTION OF THE DRAWINGS

FIGS. 1A and 1B are two views of a portion of the angle transducer including two measuring electrodes and an auxiliary electrode. A cavity for enclosing an electrolyte is illustrated.

FIGS. 2A and 2B illustrate two views of another section of the transducer including a common electrode and several guard electrodes according to the invention.

DESCRIPTION OF THE INVENTION

Figure 3B:
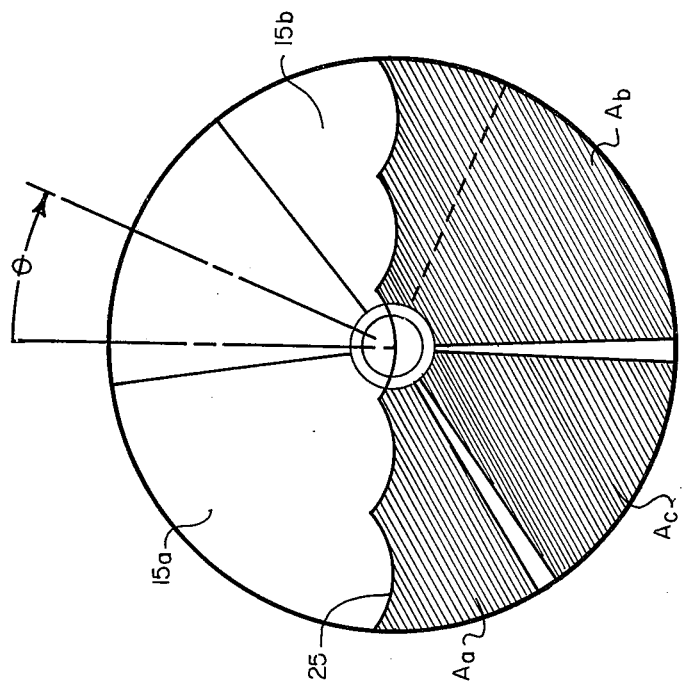
FIGS. 3A and 3B are a schematic representation of the device including an electrolyte to illustrate the operation.

In FIGS. 1A and 1B there is illustrated a cylindrical housing section 11 fabricated from a nonconducting material such as ceramic. Housing 11 includes a hub portion 13 best seen in FIG. 1B. On one interior face of cylinder 11 there are deposited several conducting regions 15a, 15b and 15c. These conducting regions may be deposited onto the ceramic body by any of a number of processes known in the art. For example a metallic conductor may be sputtered directly onto the nonconducting body. In the case of a ceramic body it has been found advantageous to first deposit a layer of molygold which is etched to form the electrode pattern, and then to overplate with a silver conductor. The electrodes 15a and 15b will sometimes hereafter be referred to as measuring electrodes while electrode 15c will sometimes be denoted as an auxiliary electrode. Although the angular span of the various electrodes may be varied, about 60 degrees has been found to be a suitable nominal angular span for auxiliary electrode 15c. A span of about 120° each is suitable for measuring electrodes 15a and 15b. An electrolytic liquid will occupy the regions 14 and be in contact with the various electrodes, as will be described in detail below.

In FIG. 2A there is illustrated a nonconducting cylindrical piece 17 which is constructed to mate with the element 11. FIG. 2B shows a cross sectional view of element 17 taken along the line B—B in FIG. 2A. Deposited onto the interior portion of element 17 is a conducting region 19 which functions as a common electrode. In devices heretofore known the conducting region serving as the common electrode extended entirely between the inner and outer diameters of unit 17. However, in accordance with a preferred embodiment of the invention, common electrode 19 occupies only a restricted region on element 17. The outer region is coated with a guard-ring electrode 21 which is electrically isolated from common electrode 19. Similarly, an inner guardring electrode 23 is deposited onto element 17 and is also electrically isolated from common electrode 19. These electrodes function to suppress unwanted leakage currents in the device; their operation will be described below.

Figure 3A:
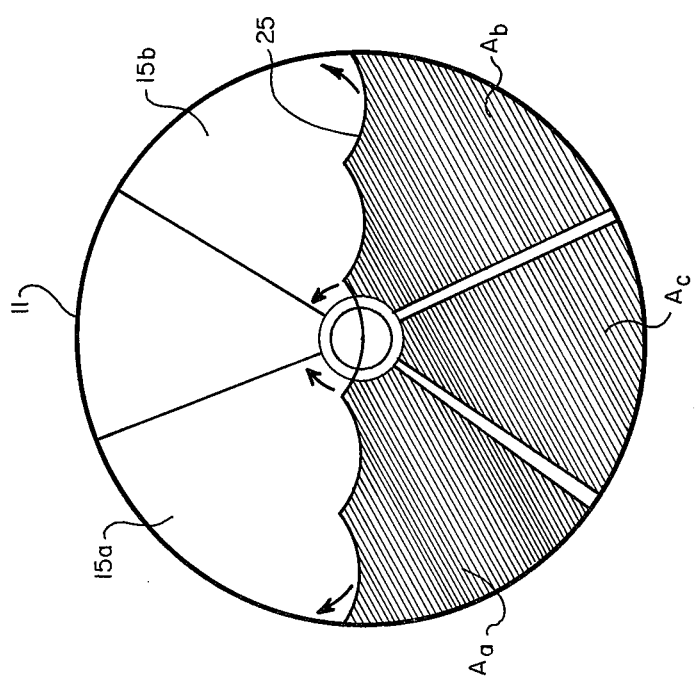

Understanding of the operation of an electrolyte-type toroidal sensor including the preferred embodiments of the present invention will be facilitated by reference to FIGS. 3A and 3B. In FIGS. 3A and 3B there is illustrated a wave-like surface 25 which schematically represents the surface of an electrolytic liquid enclosed in the region between housing elements 11 and 17. Preferably the sensor is filled with liquid up to about a central diameter of the unit.

FIG. 3A illustrates a condition in which the toroidal detector is positioned horizontally. In this position the angular displacement may be defined to be zero. The auxiliary electrode 15c is completely submerged so that an area denoted $A_c$ is in contact with the electrolyte. However, each of the measuring electrodes 15a and 15b are only partially in contact with the electrolyte to the extent of areas denoted $A_a$ and $A_b$ respectively. Since the arrangement is symmetrical, the areas $A_a$ and $A_b$ are equal when there is no angular displacement. In FIG. 3B the sensor has been rotated clockwise through an angle denoted $\theta$. Since the electrolytic liquid remains horizontal, area $A_b$ is increased by an amount above the dotted line while the area $A_a$ is decreased by a corresponding amount. However the area $A_c$ of the auxiliary electrode contact with the electrolyte remains the same.

The conducting paths between electrodes 15a, 15b, 15c and common electrode 19 effectively constitute three resistances or conductances whose values may be measured and used to determine the angle of rotation $\theta$. In particular, if the conductances are denoted by G, then for each of the paths the conductance is related to the submerged area of the electrode by the relation $$G = A/\rho T$$

Here A denotes the area of the electrode in contact with the electrolyte, T denotes the width of the electrolyte path and $\rho$ denotes the resistivity of the electrolyte.

The above mentioned fact that the areas $A_a$ and $A_b$ are decreased and increased respectively by an amount dependent on the rotation angle $\theta$ may be expressed algebraically by $$A_a = A_i - K\theta$$
$$A_b = A_i + K\theta$$

where $A_1$ denotes the area of each when the sensor is horizontal (i.e. when the angular displacement is zero).

The auxiliary electrode remains always totally submerged when the device is rotated, so the conductance $G_c$ of the auxiliary path is independent of rotation and is given by $$G_c = A_c/\rho T$$

The above relations may be simply combined to yield the rotation angle as a function of the conductances of the three current paths $$\theta = \alpha \, \frac{G_a - G_b}{G_c}$$

Where $\alpha$ is a geometric constant of proportionality. It is evident then that measurements of the values of the three conductances yields the value of the rotation angle.

Figure 4:
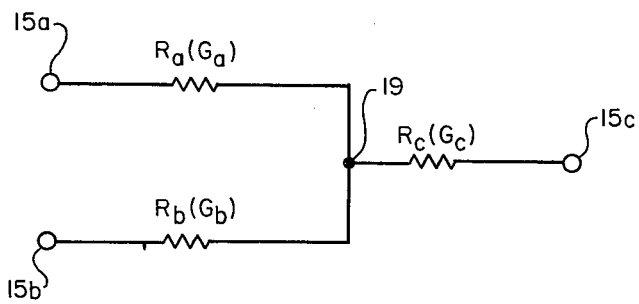
FIG. 4 shows a basic equivalent circuit of the transducer.
Figure 5:
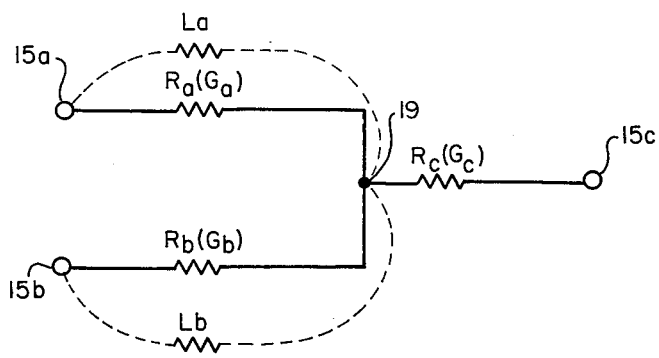
FIG. 5 illustrates an equivalent circuit for the device including spurious current leakage paths.

The present invention provides suitable apparatus for determining the various conductances in a simple and precise way. In FIG. 4 there is illustrated schematically an equivalent circuit showing the three resistances or conductances $G_a$, $G_b$ and $G_c$ existing between electrodes 15a, 15b and 15c respectively and the common electrode 19. Measurement of these values yields the values of the angle $\theta$. In known devices, it has been discovered that unwanted leakage currents have degraded the precision of the measurement. In FIG. 5 two important leakage currents noted $L_a$ and $L_b$ are schematically represented as existing between electrodes 15a, 15b and common electrode 19.

A main source of such leakage current is a wetting film of electrolyte on the insulating ceramic in the cell above the nominal liquid level when the device is agitated. Thus in FIGS. 3A and 3B several small arrows are meant to indicate that the electrolyte may be sloshed onto the inner portions of element 11 including portions of hub 13 above the electrolyte level. The extra electrolyte deposited onto the ceramic surfaces forms a spurious conducting path between the measuring electrodes 15a and 15b and common electrode 19. Such spurious conductances are represented in FIG. 5 by leakage resistors denoted $L_a$ and $L_b$.

Figure 6:
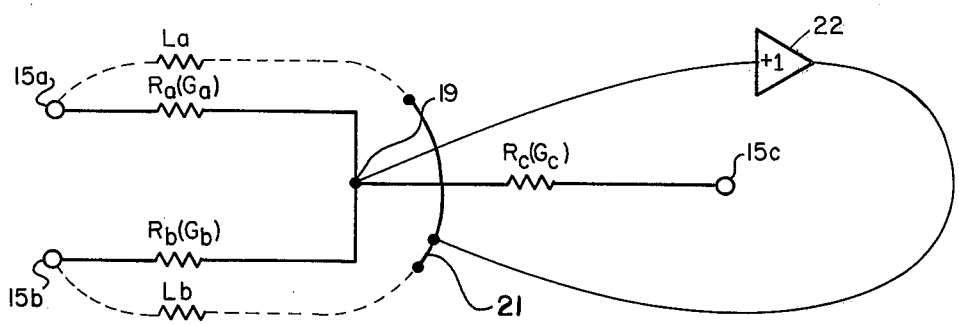
FIG. 6 is a schematic representation of the device including one of the guard-ring electrodes of FIG. 2.

The functioning of guard electrodes 21 and 23 of the present invention (illustrated in FIGS. 2A and 2B) may now be understood. Any electrolyte which is sloshed onto the ceramic surfaces of element 11 will come into contact with one of the two guard electrodes 21 or 23 rather than with common electrode 19. In accordance with the invention leakage currents between the guard electrodes and the common electrode are suppressed by driving the guard-ring electrodes at the same voltage appearing on the common electrode. In FIG. 6 guard-ring electrode 21 is schematically represented and shown to be driven by the voltage appearing on common electrode 19 through an isolating amplifier 22 having a gain of unity. The impedance of the isolation amplifier is large and may be chosen to ensure that only a minimum acceptable level of leakage current passes between the guard electrode 21 and common electrode 19. Thus the leakage currents $L_a$ and $L_b$ are diverted from common electrode 19 and do not degrade the angle measurement. A similar arrangement is provided (but not illustrated) for guard-ring electrode 23. Although the guardring electrode is shown in the particular embodiment as being driven through an isolating amplifier, other circuitry may also be used consistent with the principles of the invention.

Figure 7:
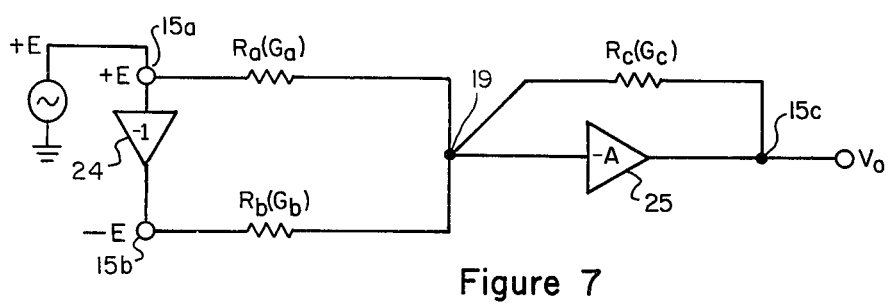
FIG. 7 is an electrical schematic of a measuring circuit for the sensor according to the invention.

In FIG. 7 there is illustrated a circuit according to a preferred embodiment of the invention which provides a single voltage output which is directly proportional to the angular displacement of the sensor. In accordance with the principles of the invention, measuring electrodes 15a and 15b are each driven by voltages identical in magnitude but opposite in sign. In practice the driving voltages may be alternating voltages supplied by a generator. A circuit arrangement should be provided to adjust the voltages in the two electrodes so that they are equal in magnitude and opposite in phase. In FIG. 7 electrode 15a is illustrated as being directly driven by a sinusoidal source having an amplitude +E while an inverting amplifier 24 of unit gain is interconnected between electrodes 15a and 15b to provide a voltage of −E on electrode 15b.

Additionally in accordance with the invention a high gain operational amplifier 25 is connected in parallel with the auxiliary resistance $R_c$ (i.e. between electrode 15c and common electrode 19). It is simple to show that in terms of the various resistances the transfer function for the circuit approaches $$\frac{V_o}{E} = \frac{R_a(R_a-R_b)}{R_a R_b}$$

as the amplifier gain approaches infinity. In terms of conductances rather than resistances the transfer function becomes $$\frac{V_o}{E} = \frac{G_a-G_b}{G_c} = \frac{\theta}{\alpha}$$

which shows at once that $V_o/E$ is directly related to the angular displacement $\theta$. Thus, if electrodes 15a and 15b are driven by sources ±E it is only necessary to make a single measurement of the output voltage $V_o$ to determine the angular displacement directly. No external calculations involving separate measurements and electrical switching are required. In practice, the amplifier gain is finite, but may be chosen to be sufficiently high to yield any particular degree of angular resolution. Gains as low as about 30 have been used, but amplifier gain of about 100 or more is preferred.

More generally it should be noted that the transfer functions set forth above describe the operation of the invention whenever the potentials E and $V_o$ are such that common electrode 19 is at a virtual ground potential. In the preferred embodiment described above this is accomplished by means of a high gain amplifier 25. However, other detecting circuitry, e.g. a null detector may also yield the desired result.

A particularly accurate sensor may be constructed by utilizing the above-described guard-ring configuration in conjunction with the sensing circuitry according to the invention.

I claim:

1. A toroidal electrolyte-type angle transducer comprising:
    a first housing element;
    a second housing element mounted with an inner surface in opposition to an inner surface of said first housing element to form a cavity therebetween;
    an electrolyte contained in a portion of said cavity;
    a plurality of conducting electrodes on the inner surface of said first housing element;
    a common electrode on the inner surface of said second housing element in electrical contact with said plurality of conducting electrodes through said electrolyte;
    at least one guard-ring electrode on the inner surface of said second housing element and spaced apart and substantially coextensive with from said common electrode to provide electrical isolation between said at least one guard-ring electrode and said common electrode; and
    equalization circuit means for driving said at least one guard-ring electrode at the same electrical potential as the potential of said common electrode to prevent the flow of current therebetween.

2. A transducer as in claim 1 wherein said common electrode is of a substantially circular shape and said at least one guard-ring electrode comprises a first electrode positioned radially outward from said common electrode and a second electrode positioned radially inward from said common electrode.

3. A transducer as in claim 1 wherein said equalization circuit means comprises a high impedance amplifier of gain substantially equal to unity interconnected between said common electrode and said at least one guardring electrode.

4. A toroidal electrolyte-type angle transducer as in claim 1 wherein said plurality of conducting electrodes comprises a first measuring electrode, a second measuring electrode, and an auxiliary electrode; said transducer further comprising:
    first circuit means for driving said first and second measuring electrodes with electrical potentials which are substantially equal in magnitude and opposite in phase; and
    second circuit means for driving said auxiliary electrode to produce a virtual ground at said common electrode.

5. A transducer as in claim 4 wherein said second circuit means comprises a high gain amplifier electrically interconnected between said auxiliary electrode and said common electrode.

6. A transducer as in claim 5 wherein said first circuit means includes an inverting amplifier of substantially unit gain interconnected between said first and second measuring electrodes for providing a driving potential on said second measuring electrode which is equal in magnitude and opposite in phase to the driving potential on said first measuring electrode.

7. A transducer as in claim 6 wherein said equalization circuit means comprises a high impedance amplifier of gain substantially equal to unity interconnected between said common electrode and said at least one guard-ring electrode.

* * * * *

UNITED STATES PATENT AND TRADEMARK OFFICE
CERTIFICATE OF CORRECTION

PATENT NO. : 3,946,494
DATED : March 30, 1976
INVENTOR(S) : Perry L. Wells

It is certified that error appears in the above—identified patent and that said Letters Patent are hereby corrected as shown below:

Col. 6, line 11, after "apart" insert -- from --;

Col. 6, line 12, cancel "from".

Signed and Sealed this eighth Day of June 1976

[SEAL]

Attest:

RUTH C. MASON
Attesting Officer

C. MARSHALL DANN
Commissioner of Patents and Trademarks